(12) United States Patent
Goddard et al.

(10) Patent No.: US 11,281,851 B2
(45) Date of Patent: Mar. 22, 2022

(54) METHOD AND SYSTEM FOR GATHERING AND TAGGING CONTENT FROM DOCUMENTS

(71) Applicants: Kevin Goddard, Ojai, CA (US); Simone Giacometti, Ojai, CA (US)

(72) Inventors: Kevin Goddard, Ojai, CA (US); Simone Giacometti, Ojai, CA (US)

( * ) Notice: Subject to any disclaimer, the term of this patent is extended or adjusted under 35 U.S.C. 154(b) by 0 days.

(21) Appl. No.: 16/195,722

(22) Filed: Nov. 19, 2018

(65) Prior Publication Data

US 2019/0155890 A1 May 23, 2019

Related U.S. Application Data

(60) Provisional application No. 62/588,372, filed on Nov. 19, 2017.

(51) Int. Cl.
| | |
|---|---|
| *G06F 40/00* | (2020.01) |
| *G06F 40/174* | (2020.01) |
| *G06F 16/387* | (2019.01) |
| *G06F 16/93* | (2019.01) |
| *G06Q 10/10* | (2012.01) |
| *G06F 40/117* | (2020.01) |

(52) U.S. Cl.
CPC .......... *G06F 40/174* (2020.01); *G06F 16/387* (2019.01); *G06F 16/93* (2019.01); *G06F 40/117* (2020.01); *G06Q 10/101* (2013.01); *G06Q 10/103* (2013.01)

(58) Field of Classification Search
CPC .... G06F 40/174; G06F 40/117; G06F 16/387; G06F 16/93
See application file for complete search history.

(56) References Cited

U.S. PATENT DOCUMENTS

| | | | | |
|---|---|---|---|---|
| 2004/0034554 | A1* | 2/2004 | Shirley | G06Q 10/06 705/7.13 |
| 2008/0040259 | A1* | 2/2008 | Snow | G06Q 40/025 705/38 |
| 2013/0205189 | A1* | 8/2013 | DiPierro | G06F 3/0483 715/224 |
| 2014/0173408 | A1* | 6/2014 | Canaud | G06F 16/235 715/226 |
| 2015/0178856 | A1* | 6/2015 | Flores | G06Q 40/123 705/31 |
| 2015/0248691 | A1* | 9/2015 | Pontious | G06Q 30/0226 705/14.27 |
| 2015/0269692 | A1* | 9/2015 | Ryan | G06Q 50/18 705/311 |

(Continued)

*Primary Examiner* — Scott T Baderman
*Assistant Examiner* — Barbara M Level
(74) *Attorney, Agent, or Firm* — Andrew Morabito

(57) ABSTRACT

The present invention is a method for collecting a person's information, completing a form, and searching for the form, the method comprising; processing, by one or more processors, a blank form, wherein a plurality of fields and field coordinates are identified, receiving, by one or more processors, a set of information, populating, by one or more processors, each of the plurality of fields with sections of the set of information in the plurality of fields, generating, by one or more processors, a superimposed image of a completed form, and applying, by one or more processors, at least one tag associated with the completed form.

15 Claims, 5 Drawing Sheets

(56) References Cited

U.S. PATENT DOCUMENTS

| | | | |
|---|---|---|---|
| 2015/0317295 A1* | 11/2015 | Sherry | G06F 40/117 |
| | | | 715/226 |
| 2016/0019372 A1* | 1/2016 | Clark | G06Q 50/24 |
| | | | 705/3 |
| 2016/0232149 A1* | 8/2016 | Macciola | G06Q 10/10 |
| 2016/0253303 A1* | 9/2016 | Pennington | G06Q 40/123 |
| | | | 715/226 |
| 2016/0275062 A1* | 9/2016 | Xu | G06F 40/174 |
| 2017/0075974 A1* | 3/2017 | Shetty | G06N 20/00 |

* cited by examiner

METHOD AND SYSTEM FOR GATHERING AND TAGGING CONTENT FROM DOCUMENTS

CROSS-REFERENCE TO RELATED APPLICATIONS

This application is a continuation and claims the benefit of priority under 35 USC 120 of U.S. application No. 62/588,372 filed on Nov. 19, 2017. The disclosure of the prior applications is considered part of (and is incorporated by reference in) the disclosure of this application.

BACKGROUND

This disclosure relates generally to release tagging systems, and more specifically to a system, process, or program to process forms, generate completed forms, and categorize the forms.

In many industries, fields, and employments, forms are needed to be signed and recorded to provide the necessary and desired documentation to meet the laws or requirements which the person or company wishes to adhere to. This becomes problematic when the signatures are needed at an on-site location, or somewhere that a computer or printer is not accessible. For example, extras in movies, television, theatre, print and the like are rarely in an office when their signatures are needed, and the person collecting the signatures is rarely the storage location for this information and may only have a smart phone or tablet to connected to a network when the signature or information is needed. With extras it is necessary to have each and every extra sign a release form for their image to be used in the film. This process has typically been done through capturing an image of the extra, having them sign the release, and storing the release with the agency. Agencies do not have a streamline way of gathering appearance releases signed, filed, and stored. The releasing process is a multi-step, labor intensive and typically unsearchable once filed. Many companies still use hardcopy releases, and are scanned in. Some of the more progressive companies captured with electronic signatures and taking a phot of the extra.

Electronic signatures or e-signatures have long been enforceable in contracts, and have the same legal consequences in many jurisdictions as more traditional forms of executing documents. Electronic signatures are useful for a variety of applications. Current techniques allow a pin number entry or a dedicated signature pad to be used with a device by a physical and/or direct electronic link.

In certain instances, various applications and web sites must interface with each other to exchange information. For example, one application may require information such as demographic data from another application. Integration of such applications may be difficult, due to proprietary software, incompatibility of programming languages or platforms, and limited information technology resources.

Users in various fields, for instance, the transport and logistics sector, the postal sector, the government, the financial sector, or the retail sector, rely on a varied set of documents for daily functions. A single document such as a driver's license, a passport, a bill of lading form, or a shipping receipt may include various kinds of information. For example, a driver's license includes a photo section; one or more text sections with the driver's name, address, and features, such as height, weight, and hair color; and a graphics section with the driver's signature. Information may be captured from these documents with a mobile device and presented to a remote processor for further analysis and processing. The remote processor may thereafter send the processed information to a user application operating on the mobile device or operating on a remote device. The user application may then use the processed information to provide application specific information to a user operating the mobile device.

Accordingly, there is a need for an improved method for capturing the extra's information, sorting this information, and providing the necessary data when requested.

SUMMARY

The present invention in a first embodiment is a method for collecting a person's information, completing a form, and searching for the form, the method comprising: processing, by one or more processors, a blank form, wherein a plurality of fields and field coordinates are identified; receiving, by one or more processors, a set of information; populating, by one or more processors, each of the plurality of fields with sections of the set of information in the plurality of fields; generating, by one or more processors, a superimposed image of a completed form; and applying, by one or more processors, at least one tag associated with the completed form.

In a second embodiment, the present invention is a computer program product for collecting a person's information, completing a form, and searching for the form, the computer program product comprising: one or more computer readable storage media and program instructions stored on the one or more computer readable storage media, the program instructions comprising: program instructions to process a blank form, wherein a plurality of fields and field coordinates are identified; program instructions to receive a set of information; program instructions to populate each of the plurality of fields with sections of the set of information in the plurality of fields; program instructions to generate a superimposed image of a completed form; and program instructions to apply at least one tag associated with the completed form.

In a third embodiment, the present invention is a computer system for collecting a person's information, completing a form, and searching for the form, the computer program product comprising: one or more computer processors, one or more computer readable storage media, and program instructions stored on the one or more computer readable storage media for execution by, at least one of the one or more processors, the program instructions comprising: program instructions to process a blank form, wherein a plurality of fields and field coordinates are identified; program instructions to receive a set of information; program instructions to populate each of the plurality of fields with sections of the set of information in the plurality of fields; program instructions to generate a superimposed image of a completed form; and program instructions to apply at least one tag associated with the completed form.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention recognize that there are many different methods and standards for completing forms, and sorting information when requested within a network. Embodiments of the present invention disclose an approach to gathering the information, generating a plurality of fields in a form, and providing a method to super impose information into these fields, be able to sort the information in various searchable categories.

The current program allows for the capturing of a person's information, compile the information into forms and upload the form into a databased which is searchable by a variety of features or information related to the form. The ability to search for the person by various tags and characteristics allow for a quick search to locate the person's forms to quickly make sure that all parties that are within the footage which is used for the film or show have signed releases without having to manually go through hundreds if not thousands of releases from the days filming.

The present invention will now be described in detail with reference to the Figures.

Figure 1:
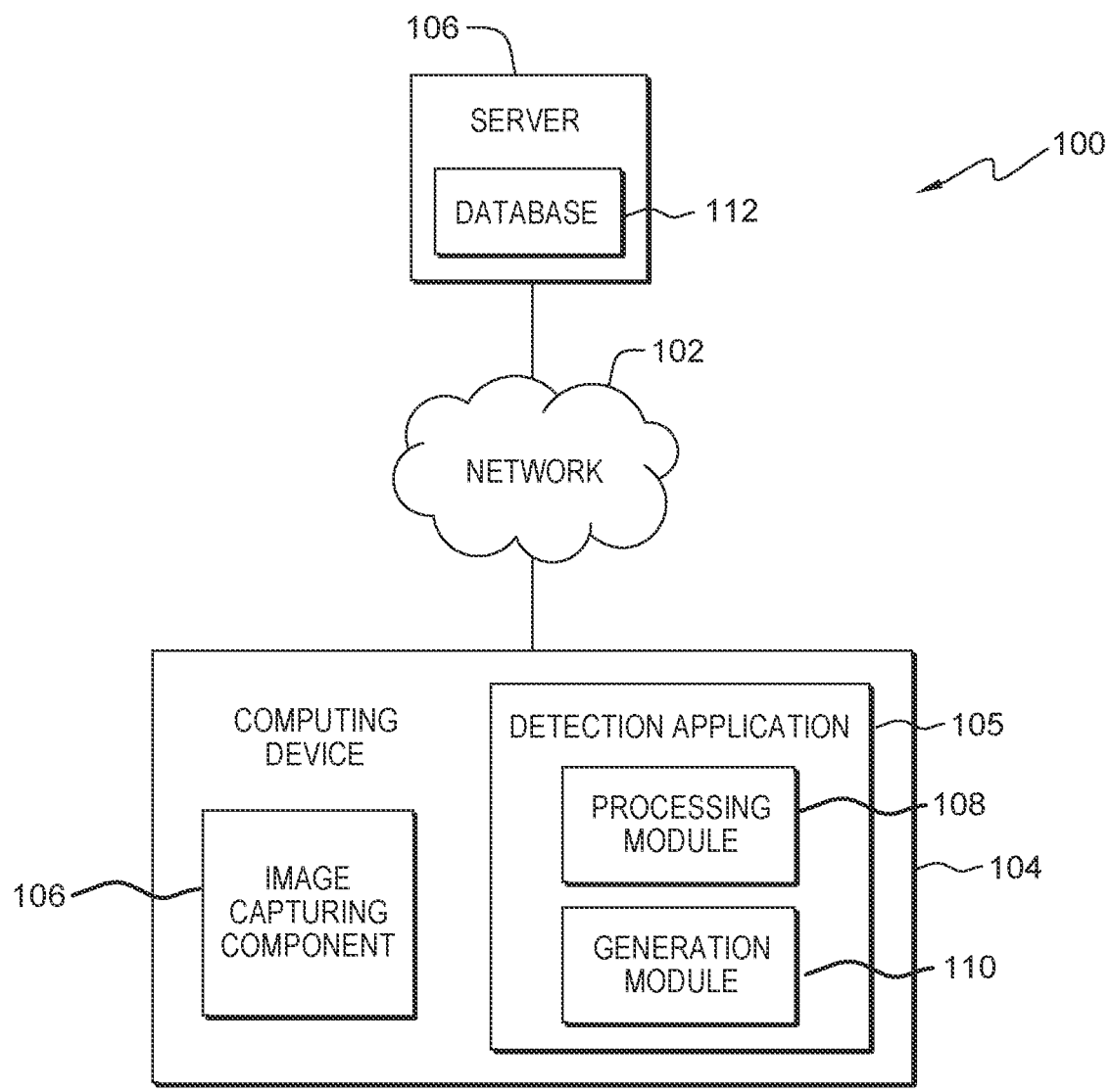
FIG. 1 depicts a block diagram depicting a computing environment, in accordance with one embodiment of the present invention.

FIG. 1 depicts a block diagram of a computing environment 100 in accordance with one embodiment of the present invention. FIG. 1 provides an illustration of one embodiment and does not imply any limitations regarding the environment in which different embodiments maybe implemented.

In the depicted embodiment, computing environment 100 includes network 102, server 106 and computing device 104. Computing environment 100 may include additional servers, computers, or other devices not shown.

Network 102 may be a local area network (LAN), a wide area network (WAN) such as the Internet, any combination thereof, or any combination of connections and protocols that can support communications between networking service 106, the computing device 104, and server 106 in accordance with embodiments of the invention. Network 102 may include wired, wireless, or fiber optic connections. The network 102 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 102 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 102 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Computing device 104 receives input from a user and transmit and receive data via network 102. The computing device 104 may be any other electronic device or computing system capable of processing program instructions and receiving and sending data. In one embodiment, the computing device 104 is a conventional computer system executing, for example, a Microsoft Windows compatible operating system (OS), Apple OS X, and/or a Linux distribution. In another embodiment, the computing device 104 can be a device having computer functionality, such as a smart-phone, a tablet, a personal digital assistant (PDA), a mobile telephone, etc. In some embodiments, computing device 104 may be a laptop computer, tablet computer, netbook computer, personal computer (PC), a desktop computer, or any programmable electronic device capable of communicating with networking service 106 and server 106 via network 102. In other embodiments, computing device 104 may represent a server computing system utilizing multiple computers as a server system, such as in a cloud computing environment. In another embodiment, computing device 104 represents a computing system utilizing clustered computers and components to act as a single pool of seamless resources.

In the depicted embodiment, computing device 104 includes image capturing component 106. This component allows for the capturing of images or videos. This may be an integrated camera or other image capturing device known to those skilled in the arts. In additional embodiments, the image capturing component 106 may be an independent element of the computing environment 100 and is connected to the computing device 104 via network 102.

In one embodiment, the computing device 104 interacts with the server 106 through an application programming interface or application, such as iOS and ANDROID. The computing device 104 may display content through the processing of markup language and displaying this information through the detection application 105. The detection application 105 displays the identified content collected from the image capturing component of the computing device 104 using the format or presentation described by the markup language. Examples of the markup language are extensible markup language (XML) data, extensible hypertext markup language (XHTML) data, or other markup language data. The detection application 105 may also include the ability to process JavaScript Object Notation (JSON) data, JSON with padding (JSONP), and JavaScript data to facilitate data-interchange between computing device 104 and the server 106. In other embodiments, computing device 104 may include any combination of detection application 105, processing module 108, generation module 110, and the image capturing component 106. Computing device 104 may include components, as depicted and described in further detail with respect to FIG. 3.

Database 112 may be a repository that may be written to and/or read by computing device 104 or various components. The data collected and processed by the detection application 105 as well as other data associated may be stored in database 112. Such information may include user information, user release forms, user data, and other account/user features and information. In one embodiment, database 112 is a database management system (DBMS) used to allow the definition, creation, querying, update, and administration of a database(s). In the depicted embodiment, database 112 resides within server 106. In other embodiments, database 112 resides on another server, or another computing device, provided that database 112 is accessible by the detection application 105 and its components.

Server 106 may be a management server, a web server, or any other electronic device or computing system capable of processing program instructions and receiving and sending data. In another embodiments server 106 may be a laptop computer, tablet computer, netbook computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment, server detection application 105 is located on server 106. Server 106 may include components, as depicted and described in further detail with respect to FIG. 7.

Detection application 105 and its components function to gather the raw data from the documents, process the raw data, determine if a request is made, and processing the request for the authorized documents. The detection application 105 takes a release form, extracts the data from the release form, including the signature, and stores the data. Then when a release form needs to be issued, a user can request a specific person's account and have an authorized release form issued. In the depicted embodiment, detection application 105 has a plurality of modules to perform specific functions of the applications design. Various modules may be included to complete these functions. In the depicted embodiment, detection application 105 resides on computing device 104 and utilizes network 102 to access server 106. In one embodiment, detection application 105 resides on a separate server, such as server 106. In other embodiments, detection application 105 may be located on another server, computing device, or exist in a cloud computing system provided detection application 105 has access to database 106, the image capturing component 106, and the modules.

Database 118 may be a repository that may be written to and/or read by detection application 105. Information associated with the information or data generated by detection application 105 may be stored to database 118. Such information may include user account information, account activity, account relationships, and other account features. In one embodiment, database 118 is a database management system (DBMS) used to allow the definition, creation, querying, update, and administration of a database(s). In the depicted embodiment, database 118 resides on server 106. In other embodiments, database 118 resides on another server, or another computing device, provided that database 118 is accessible to detection application 105.

Figure 2:
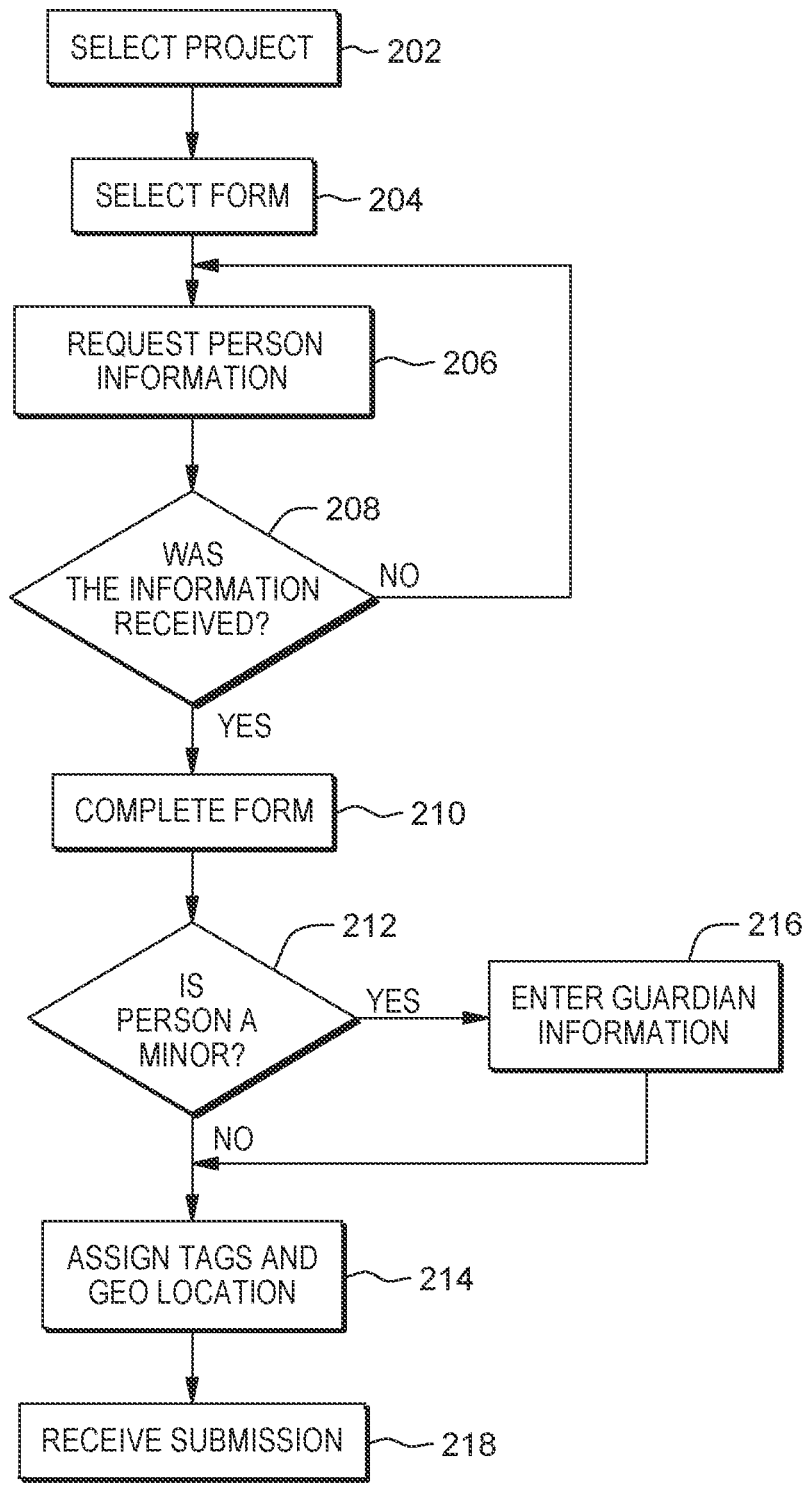
FIG. 2 depicts a flowchart of the operational steps taken by detection application to complete a form within the computing environment of FIG. 1, in accordance with an embodiment of the present invention.

FIG. 2 depicts a flowchart of the operational steps taken by the processing module 108, in accordance with one embodiment of the present invention. It should be appreciated by one skilled in the art that FIG. 2 provides only an illustration of one implementation and does not imply any limitations with regard to the environments in which different embodiments may be implemented. Many modifications to the depicted environment may be made.

In step 202, processing module 108 selects a project. Each project is given a different description and location to maintain order and ease of access of the data collected. In some embodiments, the projects are based on the event, the company, the movie, or the like.

In step 204, the processing module 108 selected the form. The form may be an electronic or hardcopy format. The documents are any hardcopy or electronic paperwork or files that contact information relevant to and related with the person whom the information is regarding. The form may be specific to the user, the employer, or a generic form included in database 118.

In some embodiments, the processing module 108 identifies each field within the form. The identification process includes, but not limited to, identifying the location of the fields (e.g. blank lines in the form), and the desired input for that field. For example, a blank line with "first name," or "address," or "signature," the processing module 108 determines what type of information is required to be input into that field.

In step 206, the processing module 108 requests person's information. This information is based on the form selected in Step 204. The information may be either manually input by the user, input by a third party, or collected from an image captured of the person's document which includes this information. For example, an identification card, drivers license, passport, or another document. The processing module 108 takes all of the gathered data and performs an extraction of the content. The extraction of the content can be performed by various natural language process to extract the various pieces of information. This analyzes identifies various features of the documents, such as, but not limited to, date, time, global position of the signature, extra attributes (e.g. gender, age, height, weight, clothing, eye color, hair color, hair line, scars, glasses, etc.), name, address, date of birth, and various other characteristic of the extra to provide a set of desired traits. The processing module 108 is used in conjunction with an image capturing component 106 that is capable of capture images, or videos. These images or videos may be pictures of the extra, pictures of the extra's license or other personal documents, release forms, or videos from the filing which the extra is filmed in. Various other documents, images, or videos may be scanned to a digital file.

In decision 208, the processing module 108 determines if the information was received. The processing module 108 views the form, the pieces of information which are required to complete the form, and the person's information received. If the processing module 108 determines that all of the person's information was received (YES branch, proceed to step 210), the processing module 108 populates the person's information into the form. If the processing module 108 determines that not all of the person's information was received (NO branch, proceed to step 206), the processing module 108 requests person's information. In some embodiments, the processing module 108 requests specific pieces of the person's information that is missing, incomplete, inelegible, or otherwise unfit. In some embodiments, this may be that the processing module 108 determines that person's information was put into the wrong field on the form. For example, if the person puts their first name in the field for their address, the processing module 108 determines that information received is incorrect.

In step 210, the processing module 108 completes the form with the received person's information. The processing module 108 inputs the person's information into the predetermined inputs in the form as well as associate an image of the person with the form. The processing module 108 requests the persons signature (either at the location or at a remote location). The signature may be written into the computing device (e.g. through a touch screen), a scanned image of a hand written signature, or a electronic signature. This image may be a picture of the person's face or a full body shot. It may also be an image of the location of relevance or an item of relevance to the form. The processing module 108 is able to determine the field requirements, locate this data from the person's information, and populate the fields in the form with the person's information.

In decision 212, the processing module 108 determines if the person is a minor. The processing module 108 analyzes the person's information related to their birth date (if this information is necessary and received, in instances where it is not this decision is skipped) of the person's information. If the processing module 108 determines that the person is a minor (e.g. below a legal age to sign on their own behalf) (YES branch, proceed to step 214), the processing module 108 requests a guardian's information. If the processing module 108 determines that the person is not a minor (NO branch, proceed to step 214), the processing module 108 assigns the tags and location of the person at the time of signing.

In step 216, processing module 108 receives the guardian's information. This may be in the form of information similar to what the minor input or may be just a signature signing on behalf of the minor. In some embodiments, there may be other requirements based on local, state, federal, or county laws.

In step 214, processing module 108 assigns tags and location of the person at the time of signing. the processing module 108 gathers data about the location of the signature by global positioning systems, as well as information about the person, the environment, the date, circumstances related to the situation (e.g. explosion, car race, movie scene, event details, or the like). In some embodiments, the person may have tags assigned through various recognition technologies such as, but not limited to facial recognition technology or the like. For example, based on what the person is wearing, their hair color or style, make-up, costume, the scene, or the like, this information may be processed, and tags are assigned to easily locate the person at a later time.

For example, some of the tags may be female, male, old, young, red hair, black hair, tall, short, fat, skinny, glasses, hat, day, night, beach, city, or the like. These tags may be predetermined or selected at that instance in time. The tags may be predetermined by the program and are prompted to the user as suggestions. In some embodiments, a set number of traits are tags which are chosen through a set list. In some embodiments, a hierarchy to the tags may be applied so specific tags are selected before other tags. In additional embodiments an unlimited number of tags can be applied to the materials.

In step 218, processing module 108 receives the submission of the documents. The person provides a signature or authorization associated with the received documents. In some embodiments, the authorization is in writing, a digital image is taken of the authorization. The processing module 108 associated the authorization with the documents. In some embodiments, at the time of submission, geographical data is collected based on the location of the device which the signature and/or submission is processed. In additional embodiments, a manual selection of the geographical information of the submission is attached to the submission.

Figure 3:
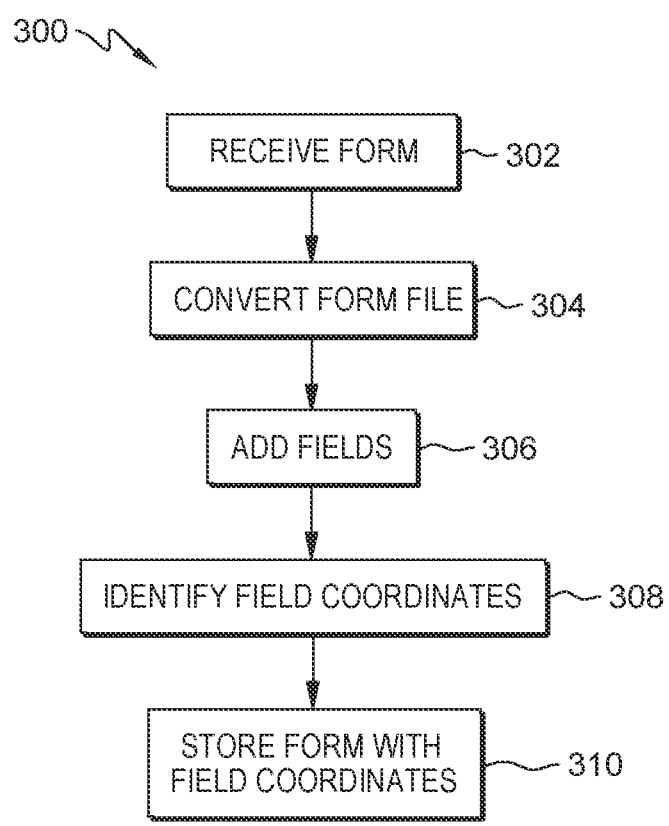
FIG. 3 depicts a flowchart of the operational steps taken the detection application to create an image of the form and populate using a computing device within the computing environment of FIG. 1, in accordance with an embodiment of the present invention.

FIG. 3 depicts a flowchart of the operational steps taken by the generation module 110, in accordance with one embodiment of the present invention. It should be appreciated by one skilled in the art that FIG. 3 provides only an illustration of one implementation and does not imply any limitations with regard to the environments in which different embodiments may be implemented. Many modifications to the depicted environment may be made.

In step 302, generation module 110 receives the form. The form is provided to the, and the person's information, and the tags and geospatial location information which was received by the processing module 108. This information is either gathered by the generation module 110 or provided to the generation module 110 by various entities.

In step 304, generation module 110 converts the form to an image file. The form file is converted to an image file, to allow for the identification of fields and the identification of the field coordinates in an easily markable file format. This maybe but not limited to JPEG or PNG file types, or the like known to those skilled in the arts.

In step 306, generation module 110 analyzes the image file version of the form to add fields. The fields are the sections of the forms which are required to be filed (or have data input) to complete the form. The adding of the fields may be performed manually or may be performed by artificial intelligence which is able to locate characteristics in the image file of what is and is not a field where data needs to be input. For example, this may be a blank line, box, or the like where a person would have to input data.

In step 308, generation module 110 identifies the field coordinates. Once the field(s) of the form are identified, the generation module 110 provides coordinates of each of the field(s). The coordinates are located based on an origination point. This provides that all the coordinates are relate to each other and an origination point. The field coordinates may be a central location of the field, or various shapes of the field to determine external limits of the field. To allow a greater area for the generation module 110 to locate the field. This is beneficial when the forms are filed in by hand and the person may not write exactly on the line but in the general area of the form.

In step 310, the generation module 110 stores the data of the field coordinates. Each set of field coordinates are stored and properly associated with the initial form. These may be stored in database 112 or another location.

Figure 4:
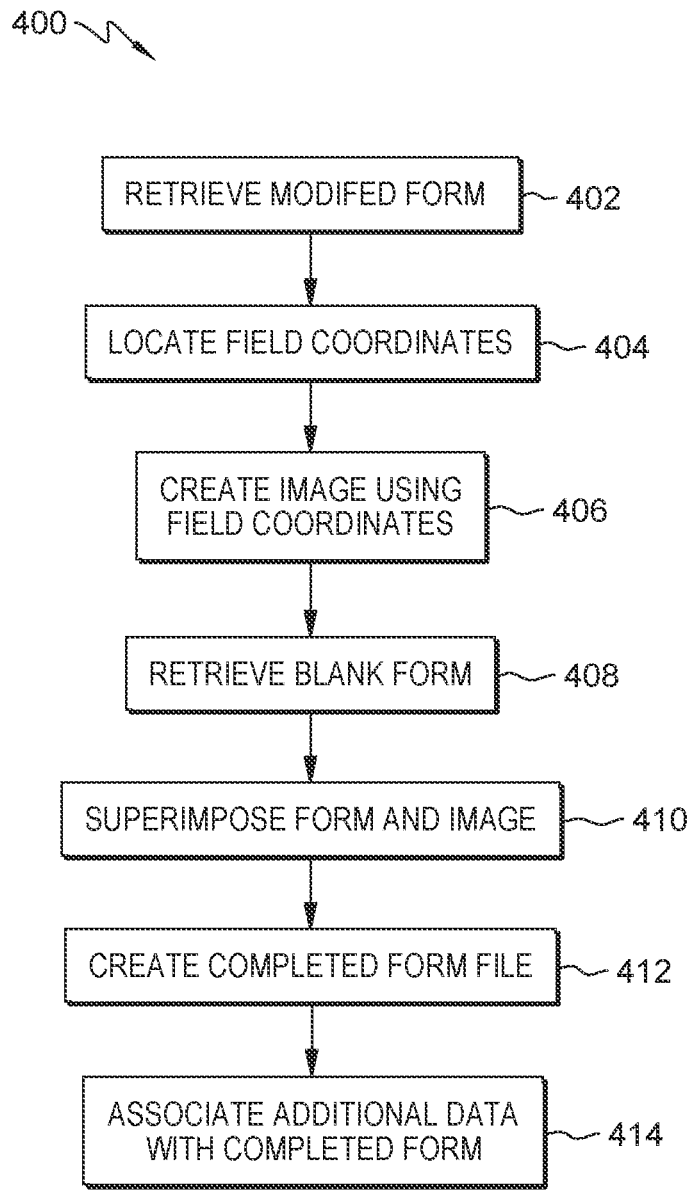
FIG. 4 depicts a flowchart of the operational steps taken by the detection application to complete the form and associate the data using a computing device within the computing environment of FIG. 1, in accordance with an embodiment of the present invention.

FIG. 4 depicts a flowchart of the operational steps taken by the generation module 110, in accordance with one embodiment of the present invention. It should be appreciated by one skilled in the art that FIG. 4 provides only an illustration of one implementation and does not imply any limitations with regard to the environments in which different embodiments may be implemented. Many modifications to the depicted environment may be made.

In step 402, generation module 110 retrieves modified form. This is the form which was has information provided by the person input into the form. This may be electronically or hand written.

In step 404, generation module 110 locates the field coordinates. Based on the previously created (FIG. 2) form with the field coordinates located, the generation module 110 locates this form to locate the field coordinates. In additional embodiments where the form is new or not accessible by the generation module 110, the steps from FIG. 2 are repeated.

In step 406, generation module 110 creates an image of the information provided by the person. Once it is determined that the form is completed, and the field coordinates are located, the generation module 110 creates an image file of the completed form. This may be the entirely of the form or just the content contained within the field coordinates.

In step 408, generation module 110 retrieves a blank version of the form. Generation module 110 retrieves a blank version of the form wherein the field coordinates are unmarked.

In step 410, generation module 110 superimposes the image and the blank form. The generation module 110 superimposes the image of the completed form and the blank form. The generation module 110 is able to line up the two documents so that the field coordinates are substantially identical matches. In instances where the completed form is created with the entirety of the form (e.g. data in fields, and the rest of the content of the form), the generation module 110 aligns the entirety of the text so that the form does not have a mirror effect of illegible due to the form text being duplicated.

In step 412, generation module 110 creates a completed form file. The completed form file is then stored on a database for access when required.

In step 414, generation module 110 associates additional data with the completed form. This is similar to the tagging process in step 214 in FIG. 2. Both tags (based on the data collected, and the image processing of the person) and the location information of the generation of the form or location of the event. The generation module 110 associates this data with the completed form In some embodiments, the generation module 110 uses the applied tags, the location information, person's information, or date as searchable terms to locate a specific person's form when a request is made. In some embodiments, the forms are searchable through an interactive map, wherein the location of the submission of the forms is presented to the user. In some embodiments, the generation module 110 is able to view an image or movie and detect features of the persons or places in the image or video and locate forms which are related to these persons or places. The generation module 110 may also be able to sort the results based on the geospatial location of the image or video. In some embodiments, the results are shown with the image. In some embodiments, the analyzes of material is limited based on the accessibility of the user, whereby keeping predetermined criteria hidden or unsearchable to protect the extras. In additional embodiments, this may be based on the date of the shooting, the content of the scene, or the like. In some embodiments, where the signing of the document was done with geo tagging, the materials can be sorted by the location of the signing. In some embodiments, specific companies or employees may have predetermined access to the materials. For example, if this is a company wide database, specific tags based on the movie being filmed will only be accessible to employees working on that movie and the rest of the materials are excluded from the search results.

This information may be presented to the user through a visual representation of the location in which the form(s) was signed, generated, or associated with. For example, when having persons sign the form on site while filming a movie, it is beneficial to be able to locate all forms related to extras at each location. This is beneficial because there may be hundreds of forms at the end of filming, and to be able to locate all forms that were signed at each filming location provides a fast and reliable search mechanism to locate all forms of relevance.

In some embodiments, generation module 110 provides an altered version of the completed forms, when the person requesting the information does not have proper clearance. The generation module 110 allows the person to gain access to the completed form, but based on predetermined setting to the person's account, various fields or other pieces of information (e.g. tags and location data) may be unavailable. For example, if a social security number is required for a form, but a select few employees need or have access to this information. Through the method described above with the identification of each field, if a user's account does not have the proper cleared, the social security information is blacked out or unreadable.

In some embodiments, the generation module 110 allows for various types of exporting of the forms. Based on the search requirements and the results, the generation module 110 may permit for the exportation of one, two or more, or all of the forms located as a result of the search function. The forms may be downloaded in various file formats and types.

Figure 5:
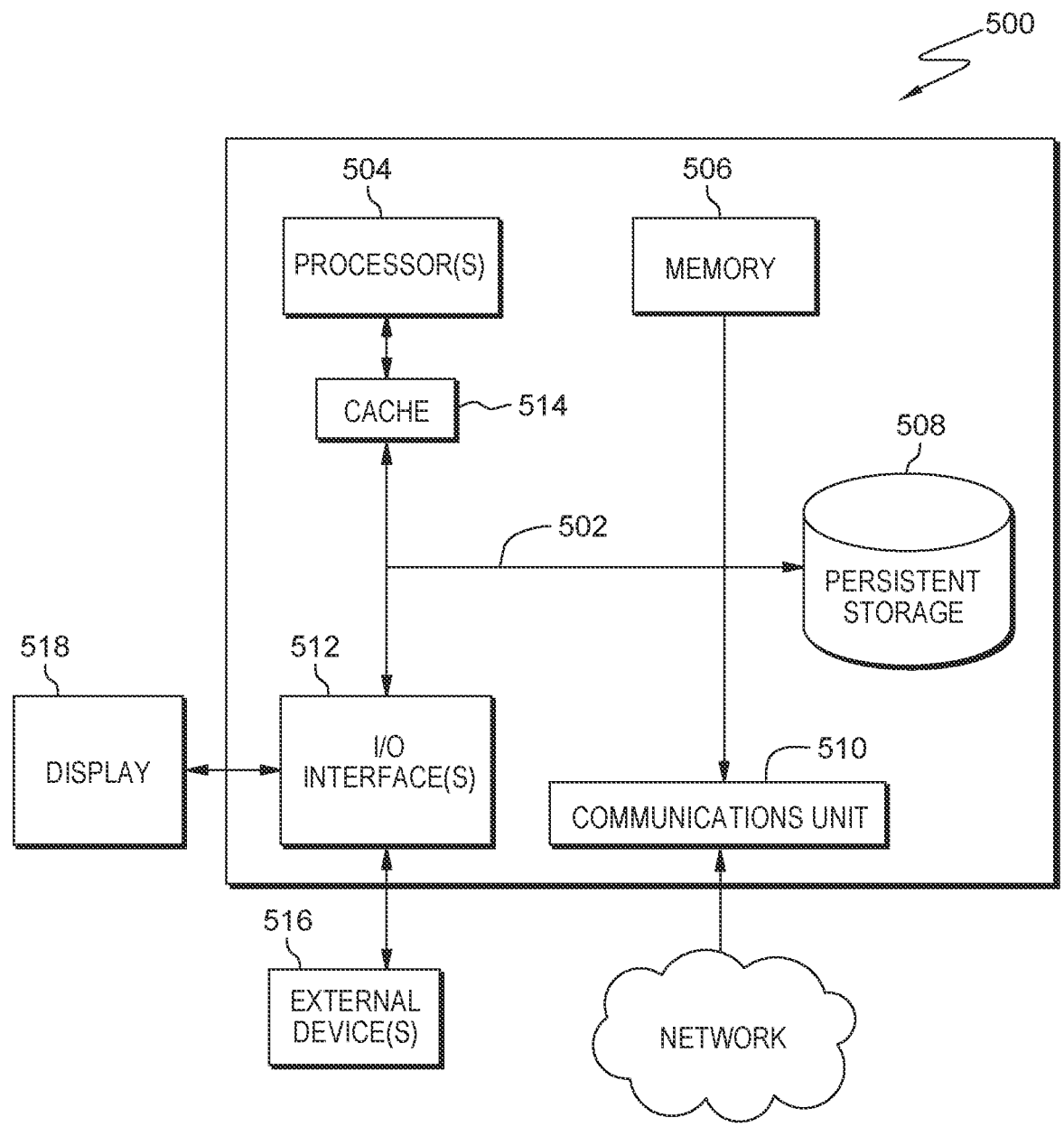
FIG. 5 depicts a block diagram depicting the internal and external components of the server of FIG. 1, in accordance with one embodiment of the present invention.

FIG. 5 depicts a block diagram 500 of components of a computing device (e.g. server 106 and computing device 104), in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. It should be appreciated FIG. 1 provides only an illustration of one implementation and does not imply any limitations with regard to the environments in which different embodiments may be implemented.

Computing environment 500 is, in many respects, representative of the various computer subsystem(s) in the present invention. Accordingly, several portions of computing environment 500 will now be discussed in the following paragraphs.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any additional hardware components within a system. For example, communications fabric 502 can be implemented with one or more buses.

Computing device 500 is capable of communicating with other computer subsystems via network 501. Network 501 can be, for example, a local area network (LAN), a wide area network (WAN) such as the Internet, or a combination of the two, and can include wired, wireless, or fiber optic connections. In general, network 501 can be any combination of connections and protocols that will support communications between computing device 500 and other computing devices.

Memory 506 and persistent storage 508 are computer-readable storage media. In one embodiment, memory 506 includes random access memory (RAM) and cache memory 514. In general, memory 506 can include any suitable volatile or non-volatile computer-readable storage media.

Memory 506 is stored for execution by one or more of the respective computer processors 504 of computing device 500 via one or more memories of memory 506 of computing device 500. In the depicted embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in the examples, provides for communications with other data processing systems or devices, including computing device 500. In the examples, communications unit 510 includes one or more network interface cards. Communications unit 510 may provide communications through the use of either or both physical and wireless communications links.

I/O interface(s) 512 allows for input and output of data with other devices that may be connected to computing device 500. For example, I/O interface 512 may provide a connection to external devices 516 such as a keyboard, keypad, camera, a touch screen, and/or some other suitable input device. External devices 516 can also include portable computer-readable storage media such as, for example, thumb drives, portable optical or magnetic disks, and memory cards. Software and data used to practice embodiments of the present invention, can be stored on such portable computer-readable storage media and can be loaded onto persistent storage 508 of computing device 500 via I/O interface(s) 512 of computing device 500. Software and data used to practice embodiments of the present invention, can be stored on such portable computer-readable storage media and can be loaded onto persistent storage 508 of computing device 500 via I/O interface(s) 512 of computing device 500. I/O interface(s) 512 also connect to a display 518.

Display 518 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing device, partly on the computing device, as a stand-alone software package, partly on the computing device and partly on a remote computer or entirely on the remote computer or server. In the latter scenario, the remote computer may be connected to the computing device through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:

1. A method for collecting a person's information, completing a form, and searching for the form, the method comprising:
   processing, by one or more processors, a blank form, wherein a plurality of fields are identified;
   receiving, by one or more processors, a set of information associated with a person, wherein the set of information includes a photograph and a document;
   analyzing, by one or more processors, the set of information to identify predetermined data points;
   analyzing, by one or more processors, the photograph, wherein characteristics of the photograph are identified and stored;
   program instructions to extract data from the photograph, the at least one document, and the geographical location
   exporting, by one or more processors, a set of required information from the photograph and the document associated with the person;
   populating, by one or more processors, each of the plurality of fields with sections of the set of information;
   receiving, by one or more processors, a signature on the populated form, and applying time and location information to the populated form;
   generating, by one or more processors, a superimposed image of a completed form;
   applying, by one or more processors, at least one tag associated with a completed form, wherein the at least one tag is searchable and the at least one tag is information which was not populated into one of the plurality of fields;
   categorizing, by one or more processors, the completed form, based on the at least one tags, and the information populated in the plurality of fields;
   submitting, by one or more processors, the completed form, wherein the photograph of the person is incorporated with the submission.

2. The method of claim 1, wherein at the generation of the completed form, further comprises submitting, by one or more processors, the completed form, wherein a geographical location of the submission is incorporated with the submission.

3. The method of claim 2, further comprising, searching, by one or more processors, for at least one completed form, by signature location, through a visual depiction of the completed forms determined by the geographical location of the submission.

4. The method of claim 1, further comprising, requiring, by one or more processors, additional information, wherein it is determined that the set of information is associated with a minor, and wherein the set of information is analyzed to determine if the person is minor.

5. The method of claim 1, further comprising, requesting, by one or more processors, additional information, wherein it is determined that at least one of the at least one plurality of fields are incorrect or incomplete.

6. A computer program product for collecting a person's information, completing a form, and searching for the form, the computer program product comprising:
   one or more computer readable storage media and program instructions stored on the one or more computer readable storage media, the program instructions comprising:
   program instructions to process a blank form, wherein a plurality of fields are identified;

program instructions to receive a set of information, wherein the set of information includes a photograph, a document, and a geographical location;
program instructions to identify data contained within the photograph and the document in the set of information based on the plurality of fields on the blank form;
program instructions to extract data from the photograph, the at least one document, and the geographical location
program instructions to populate each of the plurality of fields with data of the set of information, wherein the data is positioned within the identified plurality of fields;
program instructions to generate an image of a populated form;
program instructions to apply at least one tag associated with the populated form;
program instructions to categorize the populated form based on the at least one tag, the geographical location, or the set of information which was populated into the plurality of fields;
program instructions to export a set of required information from the image of the populated form;
program instructions to modify the populated form so that the populated form is searchable; and
program instructions to search for at least one completed form, by signature location, through a visual depiction of the completed forms determined by the geographical location of the submission.

7. The computer program product of claim 6, further comprises, program instructions to submit a completed form with a signature-location.

8. The computer program product of claim 6, further comprising, program instructions to require additional information, wherein it is determined that the set of information is associated with a minor.

9. The computer program product of claim 6, further comprising, program instructions to request additional information, wherein it is determined that at least one of the at least one plurality of fields are incorrect or incomplete.

10. A computer system for collecting a person's information, completing a form, and searching for the form, the computer system comprising:
one or more computer processors, one or more computer readable storage media, and program instructions stored on the one or more computer readable storage media for execution by, at least one of the one or more processors, the program instructions comprising:
program instructions to process a blank form, wherein a plurality of fields and field coordinates are identified;
program instructions to receive a set of information, wherein the set of information includes a photograph, at least one document and a geographical location;
program instructions to extract data from the photograph, the at least one document, and the geographical location;
program instructions to populate the plurality of fields with a portion of the data that was extracted from set of information based on the processed blank form's field requirements and positioning the populated data within the field based on the field coordinates;
program instructions to generate a completed form, wherein the completed form includes the photograph;
program instructions to associate additional data to the completed form, wherein the additional data is from a second set of information;
program instructions to analyze the completed form and apply at least one tag to the completed form, wherein the at least one tag is related to data extracted from the photograph and the geographical location is categorized and searchable; and
program instructions to indicate a signature was input on the completed form, and collecting the geographical signature location and applying at least one tag to the geographical signature location.

11. The computer system of claim 10, further comprising, program instructions to categorize the completed form, based on the at least one tags, and the information populated in the plurality of fields.

12. The computer system of claim 10, further comprising, program instructions to require additional information, wherein it is determined that the set of information is associated with a minor.

13. The computer system of claim 10, further comprising, program instructions to request additional information, wherein it is determined that at least one of the at least one plurality of fields are incorrect or incomplete.

14. The computer system of claim 10, further comprising, reviewing the set of information to determine an age of the person, wherein if it is determined that the person is below a predetermined age, a request for a guardian is generated.

15. The computer system of claim 14, further comprising, requesting a second set of information related to the guardian.

* * * * *